V. KRAMER.
FLY TRAP.
APPLICATION FILED JAN. 10, 1913.
1,071,437.
Patented Aug. 26, 1913.
2 SHEETS—SHEET 2.
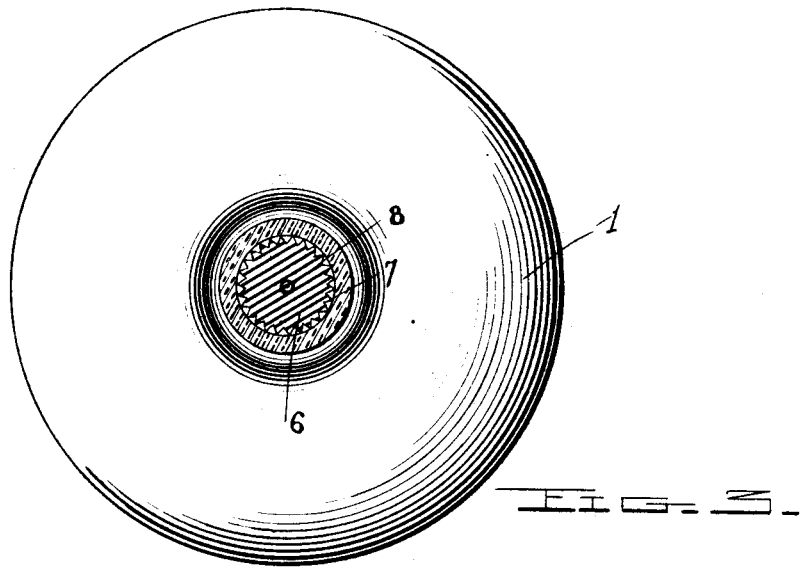
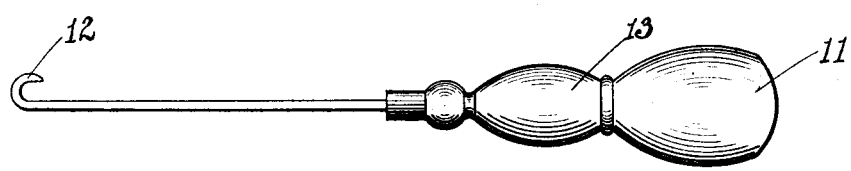
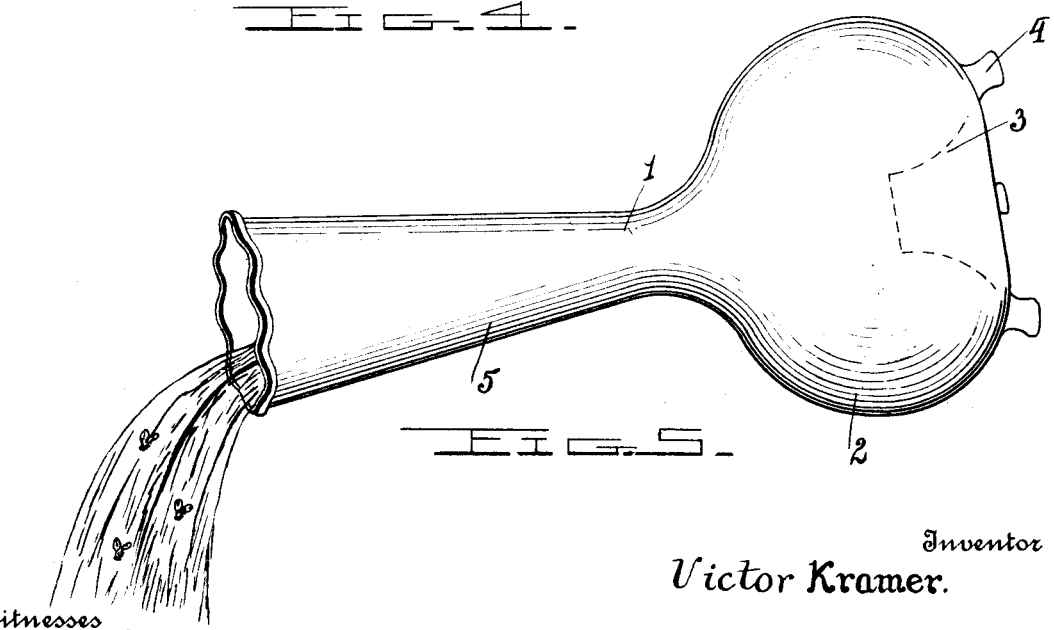
Inventor
Victor Kramer.
Witnesses
By Victor J. Evans
Attorney

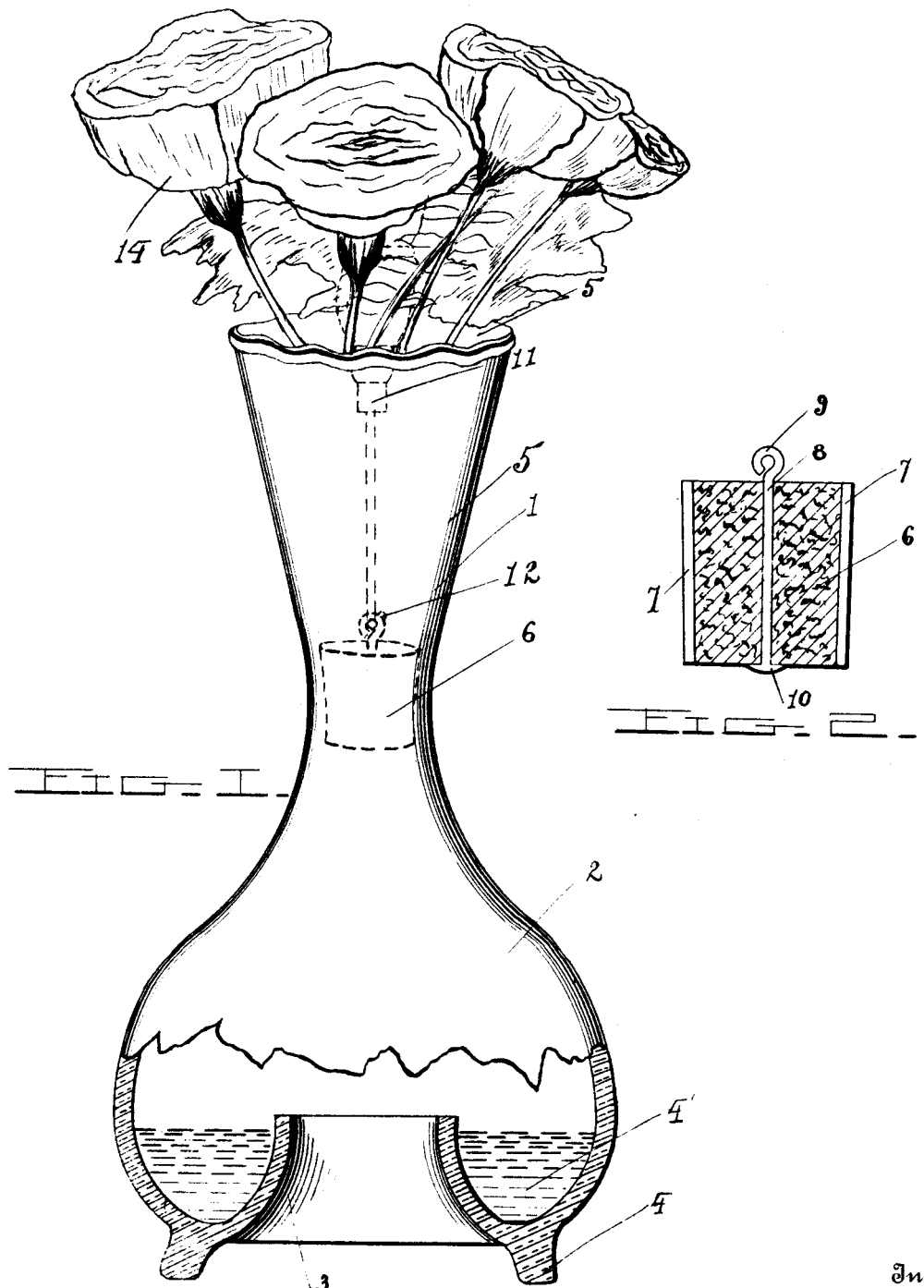

UNITED STATES PATENT OFFICE.

VICTOR KRAMER, OF NEW HAVEN, CONNECTICUT.

FLY-TRAP.

1,071,437.　　　Specification of Letters Patent.　　Patented Aug. 26, 1913.

Application filed January 10, 1913. Serial No. 741,284.

*To all whom it may concern:*

Be it known that I, VICTOR KRAMER, a citizen of the United States, residing at New Haven, in the county of New Haven and State of Connecticut, have invented new and useful Improvements in Fly-Traps, of which the following is a specification.

This invention relates to certain novel improvements in combined flower holders and insect traps.

In carrying out my invention it is my purpose to provide a device of this character of ornamental design and adapted for setting on a table or mantelpiece, that serves as a vase for holding flowers and as a means for trapping flies and other insects.

The primary object of the invention is to provide a simple and inexpensive appliance of the general type, and especially adapted for the table use stated, and the parts so arranged whereby the operation of cleaning out the trap is expeditiously and conveniently provided for.

I also aim to provide an ornamental structure for the purpose set forth comprising a vase which forms the trap proper, the said vase having an integrally formed flaring neck which serves as a holder for flowers, the neck being separated from the vase through the medium of a stopper which forms a partition between the said members, the said stopper having its sides ribbed or corrugated and being constructed of yieldable material, whereby the said stopper may be raised or lowered to allow the water for the flowers within the neck of the bottle to percolate through the said corrugations to the trough provided by the bell-shaped vase.

A still further object of the invention is to provide a yieldable partition with a removing element, the said element having its upper portion suitably ornamented and adapted to serve as a center for the flowers, so that the same may be arranged around the said element to prevent the bunching of the flowers and to properly display the same.

With the above recited objects and others of a similar nature in view, the invention resides in the novel construction and arrangement of parts in operative combination as will hereinafter be fully described and claimed.

In the accompanying drawings, Figure 1 is a perspective view of a device constructed in accordance with the present invention. Fig. 2 is a central vertical longitudinal sectional view of the compressible partition. Fig. 3 is a horizontal section through the neck and partition. Fig. 4 is a perspective view of the partition removing element. Fig. 5 is a view illustrating the manner of draining the trap of insects.

Referring now to the drawings in detail, the numeral 1 designates the improved flower holder and insect trap. The device may be constructed of any desired material, glass preferred, and the said device comprises a substantially bell-shaped vase 2, the lower wall of which having its central portion bent to provide an internal angular flange 3, and the said vase is also provided with suitable feet 4 upon which the device rests. The space between the angular flange 3 and the bell-shaped vase proper provides a trough 4' which in practice is partially filled with water or other insect killing liquid, and which may be poured through the neck 5 or through the angular flange 3, when the partition, hereinafter described, is removed from within the neck. The neck 5 is preferably flared from its mouth to its point of connection with the vase 2, and positioned within the said neck is a removable compressible partition 6. This partition has its periphery corrugated or ribbed as designated by the numeral 7 and the said partition is centrally provided with a wire 8 which terminates in a ring 9 upon the upper face of the said partition. The wire 8 has its opposite portion off-set or headed as at 10 so that the said wire cannot be accidentally pulled or otherwise removed from the partition.

The numeral 11 designates a combined flower centering element as well as a pull or remover for the partition. This element 11 has its lower extremity hooked as at 12, the said hook normally engaging with the ring 9 of the wire 8, while the upper portion of the member 11 is provided with an enlarged ornamental handle 13. The member 11, it will be noted, is employed for compressing the corrugated surface of the partition 8 against the neck of the bottle, so as to reduce or enlarge the spaces provided by the said corrugations, and the said member 11 further centers the flowers 14 which are arranged within the neck so that the said flowers are prevented from clustering or bunching and are fully displayed. The partition may be tightly compressed against the inner wall of the neck 5, so that its corrugated surface will be flattened. Water for the stems of the flowers, may be then placed in the neck of the vase above the partition and not permitted to penetrate below the said partition. However, when the said water is to be drained from the stems of the flowers, without necessitating the tilting of the vase, a pull in an upward direction by the member 11 will cause the corrugated surface of the stopper 6 to expand and to allow the water to flow against the sides of the vase to the trough thereof, the flow being, of course, regulated by the distance the partition is raised within the flaring neck. The water flowing from above the compressible partition to within the trough 4 will contact with any insect which attempts to find an exit through the spaces provided by the corrugations, but, it may here be stated that, the spaces between the ribs or corrugations are so slight as not to permit of the exit of an ordinary sized insect. The water from the neck 11 may thus be emptied without necessitating the removal of the flowers from the neck, after which the partition is again compressed against the neck through the medium of the member 11 and fresh water may then be inserted within the neck.

Having thus fully described the said invention, what I claim is:—

1. An appliance for the purpose set forth comprising a bell-shaped vase provided with feet and a reduced flaring neck integrally formed with the vase, the vase being centrally provided with an internal annular flange adapted to form a trough between the said flange and the vase proper, a removable compressible partition within the vase, and said partition having its periphery corrugated or indented.

2. An appliance for the purpose set forth comprising a bell-shaped vase having feet and a reduced flaring mouth integrally formed with the vase, the vase being centrally provided upon its inner face with an inturned annular flange, a compressible partition within the neck and having longitudinal peripheral passages, and means for adjusting the partition within the neck to close or to permit of the opening of said passages.

In testimony whereof I affix my signature in presence of two witnesses.

VICTOR KRAMER.

Witnesses:
   Jos. Edw. Kromer,
   Ludwik Pise.